US007170535B2

(12) United States Patent
Matsuda (10) Patent No.: US 7,170,535 B2
(45) Date of Patent: Jan. 30, 2007

(54) IMAGE PROCESSING SYSTEM, PROJECTOR, PROGRAM, INFORMATION STORAGE MEDIUM, AND IMAGE PROCESSING METHOD

(75) Inventor: Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 588 days.

(21) Appl. No.: 10/752,694

(22) Filed: Jan. 8, 2004

(65) Prior Publication Data

US 2004/0196303 A1 Oct. 7, 2004

(30) Foreign Application Priority Data

Jan. 23, 2003 (JP) ............... 2003-014666

(51) Int. Cl.
*G09G 5/10* (2006.01)
(52) U.S. Cl. ......................... 345/690; 345/89
(58) Field of Classification Search .......... 345/83, 345/84, 87, 88, 89, 690, 691, 692, 694; 353/69; 348/33.1; 349/5–10
See application file for complete search history.

(56) References Cited

U.S. PATENT DOCUMENTS

| 5,231,481 | A | | 7/1993 | Eouzan et al. | |
|---|---|---|---|---|---|
| 5,315,378 | A | * | 5/1994 | Satou et al. | 348/655 |
| 5,793,441 | A | | 8/1998 | Hagerman | |
| 6,043,797 | A | * | 3/2000 | Clifton et al. | 345/589 |
| 6,292,535 | B1 | * | 9/2001 | Williams et al. | 378/98.8 |
| 6,388,648 | B1 | * | 5/2002 | Clifton et al. | 345/88 |
| 6,445,815 | B1 | * | 9/2002 | Sato | 382/154 |
| 6,636,229 | B2 | * | 10/2003 | Ishikawa et al. | 345/590 |
| 6,668,084 | B1 | * | 12/2003 | Minami | 382/215 |
| 2003/0179211 | A1 | * | 9/2003 | Wada et al. | 345/589 |
| 2005/0094108 | A1 | * | 5/2005 | Kobayashi | 353/69 |

FOREIGN PATENT DOCUMENTS

| JP | A-08-223519 | 8/1996 |
|---|---|---|
| JP | A-2001-134252 | 5/2001 |
| JP | A-2001-343955 | 12/2001 |
| JP | 2002-152552 | 5/2002 |
| JP | A 2002-140060 | 5/2002 |
| JP | 2002-281520 | 9/2002 |
| JP | 2002-311503 | 10/2002 |

* cited by examiner

*Primary Examiner*—Nitin Patel
(74) *Attorney, Agent, or Firm*—Oliff & Berridge, PLC (57) ABSTRACT

In order to provide an image processing system that can correct color non-uniformity due to deterioration with time in a more appropriate manner, a projector is provided with an image projection section which displays a calibration image; a sensing section which senses the displayed calibration image; an area detection section which detects an image display area based on sensing information, and also divides the image display area into a plurality of target areas; a brightness information generation section which generates brightness information which indicates an average brightness index value within each of the target areas that have been divided by the area detection section, based on the sensing information; a correction amount calculation section which calculates a correction amount for input-output characteristic data from each of the target areas, based on the brightness information; and a color non-uniformity correction section which corrects color non-uniformity of the image, based on input-output characteristic data that has been corrected based on the correction amount.

11 Claims, 7 Drawing Sheets

IMAGE PROCESSING SYSTEM, PROJECTOR, PROGRAM, INFORMATION STORAGE MEDIUM, AND IMAGE PROCESSING METHOD

Japanese Patent Application No. 2003-14666, filed on Jan. 23, 2003, is hereby incorporated by reference in its entirety.

BACKGROUND OF THE INVENTION

The present invention relates to an image processing system, a projector, a program, an information storage medium, and an image processing method that correct color non-uniformity in images.

When an image is displayed for a long time by an image display device such as a projector, color non-uniformity (including color non-uniformity due to luminance non-uniformity) is created in the image and thus the image gradually deteriorates.

This could happen when a projector is used to display an image continuously on a screen in a store or exhibition hall, for example. In such a case, the original display effect could be lost due to deterioration of components such as the liquid-crystal panel or a polarized plate during projection over a long period of time, which could generate color non-uniformity in the image.

As an example of a solution that addresses the above problem, Japanese Patent Application No. 2000-334149 (Japanese Patent Application Laid-Open No. 2002-140060) discloses an image display system having a bulletin means that measures the operating time of a display means and correction means that corrects information for image modification in such a manner that a target color is reproduced, based on the time information and target color region information, in order to automatically correct deterioration of a uniform color due to deterioration caused by a light source or the like.

However, color non-uniformity deterioration does not include only deterioration of the entire image; it also includes deterioration of parts of the image.

With a liquid-crystal projector, by way of example, long-term use can lead to variations in the quantity of light in components such as liquid-crystal light valves and polarized plates, caused by the effects of light from light sources. Variations in light quantity are particularly likely to occur in liquid-crystal light valves and polarized plates within the paths of powerful blue light and highly energy-intensive (large light quantity) green light. Such deterioration in the liquid-crystal light valves or polarized plates leads not only to deterioration the entire polarized plates, but also to deterioration of parts thereof. As a result, not only the entire image, but also parts of that image could deteriorate.

In such a case, it would be difficult to correct the image as appropriate with the method disclosed in Japanese Patent Application Laid-Open No. 2002-140060, wherein information on the operating time of the display means.

BRIEF SUMMARY OF THE INVENTION

The present invention was devised in the light of the above-described problems, and may provide an image processing system, a projector, a program, an information storage medium, and an image processing method that enable a more appropriate correction of color non-uniformity due to deterioration with time.

To solve the above-described problems, an image processing system in accordance with one aspect of the present invention comprises:

a display means for displaying a predetermined calibration image;

a sensing means for sensing the displayed calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

An image processing system in accordance with another aspect of the present invention comprises:

a display section which displays a predetermined calibration image;

a sensing section which senses the displayed calibration image;

an area detection section which detects an image display area based on sensing information obtained by the sensing section, and also divides the image display area into a plurality of target areas;

a brightness information generation section which generates brightness information which indicates an average brightness index value within each of the target areas that have been divided by the area detection section, based on the sensing information;

a correction amount calculation section which calculates a correction amount for input-output characteristic data from each of the target areas, based on the brightness information; and a color non-uniformity correction section which corrects color non-uniformity of the image in each of the target areas, based on input-output characteristic data that has been corrected based on the correction amount, wherein the display section displays an image in which color non-uniformity has been corrected by the color non-uniformity correction section.

A projector in accordance with a further aspect of the present invention comprises:

a display means for projecting a predetermined calibration image;

a sensing means for sensing the projected calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

A projector in accordance with a still further aspect of the present invention comprises:

a display section which projects a predetermined calibration image;

a sensing section which senses the projected calibration image;

an area detection section which detects an image display area based on sensing information obtained by the sensing section, and also divides the image display area into a plurality of target areas;

a brightness information generation section which generates brightness information which indicates an average brightness index value within each of the target areas that have been divided by the area detection section, based on the sensing information;

a correction amount calculation section which calculates a correction amount for input-output characteristic data from each of the target areas, based on the brightness information; and a color non-uniformity correction section which corrects color non-uniformity of the image in each of the target areas, based on input-output characteristic data that has been corrected based on the correction amount, wherein the display section displays an image in which color non-uniformity has been corrected by the color non-uniformity correction section.

A program in accordance with an even further aspect of the present invention is a computer-readable program causing the computer to function as:

a display control means for controlling a display means for displaying a predetermined calibration image;

a sensing control means for controlling a sensing means for sensing the displayed calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

An information storage medium in accordance with a yet further aspect of the present invention is an information storage medium which stores a computer-readable program, the program causing the computer to function as:

a display control means for controlling a display means for displaying a predetermined calibration image;

a sensing control means for controlling a sensing means for sensing the displayed calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

An image processing method in accordance with an even more further aspect of the present invention comprises:

displaying a predetermined calibration image;

sensing the displayed calibration image; and generating sensing information;

detecting an image display area based on the sensing information;

dividing the image display area into a plurality of target areas;

generating brightness information which indicates an average brightness index value within each of the target areas that have been divided, based on the sensing information;

calculating a correction amount for input-output characteristic data from each of the target areas, based on the brightness information; and correcting color non-uniformity of the image in each of the target areas, based on input-output characteristic data that has been corrected based on the correction amount;

displaying an image in which color non-uniformity has been corrected.

Since the present invention enables the image processing system or the like to detect which of the target areas is insufficiently bright, by dividing the image display area into a plurality of target areas and detecting the average brightness index value for each of those target areas, it is possible to detect whether there is deterioration in part of the image.

The image processing system or the like can correct color non-uniformity due to deterioration with time as appropriate, by obtaining a correction amount for each of the divided target areas and correcting color non-uniformity for each of the divided target areas.

Note that the input-output characteristic data in this case is data indicating the input-output characteristics, which is data indicating the relationship between a brightness index value (such as a grayscale value) of the input signal and a brightness index value (such as a luminance value, illuminance, or color information value) of the output signal. The brightness index value is a value that forms an index for brightness. More specifically, it is equivalent to a luminance value, illuminance, color information value (such as a digitized signal of the R signal), grayscale value, or a normalized version of those values.

In the image processing system, the projector, the program, and the information storage medium, the display means may display a plurality of types of calibration images having different grayscale values, and the brightness information generation means may generate information as the brightness information, the information including:

area information indicating which of the target areas is applicable;

grayscale value information indicating a grayscale value of the calibration image;

image information indicating which of the plurality of types of calibration images is used; and an average brightness index value information indicating average brightness index value in the target area.

The image processing method may further comprise:

displaying a plurality of types of calibration images having different grayscale values, when the predetermined calibration image is displayed; and generating information as the brightness information, the information including:

area information indicating which of the target areas is applicable;

grayscale value information indicating a grayscale value of the calibration image;

image information indicating which of the plurality of types of calibration images is used; and an average brightness index value information indicating average brightness index value in the target area.

Since this enables the image processing system or the like to obtain an average brightness index value of the image that is actually being displayed for each grayscale value, and also determine any difference in the average brightness index value for each grayscale value, it makes it possible to provide more appropriate correction of color non-uniformity due to deterioration with time.

In the image processing system, the projector, the program, and the information storage medium, the correction amount calculation means may calculate a correction amount so that an input-output characteristic approaches a state in which there is no color non-uniformity, based on the average brightness index value for each grayscale value that is based on the brightness information.

The image processing method may further comprise calculating a correction amount so that an input-output characteristic approaches a state in which there is no color non-uniformity, based on the average brightness index value for each grayscale value that is based on the brightness information.

Since this enables an approximation to the input-output characteristic in the state in which there is no deterioration, by calculating correction amounts so that the input-output characteristic approaches the state in which there is no color non-uniformity, it makes it possible to provide more appropriate correction of color non-uniformity.

DETAILED DESCRIPTION OF THE EMBODIMENT

In the description below, the present invention is applied to a projector having an image processing system, by way of example, with reference to the accompanying figures. Note that the embodiments described below do not in any way limit the scope of the present invention as laid out in the claims herein. In addition, the entirety of the configuration described with reference to these embodiments is not limited to being essential structural components of the present invention.

Description of Overall System

Figure 1:
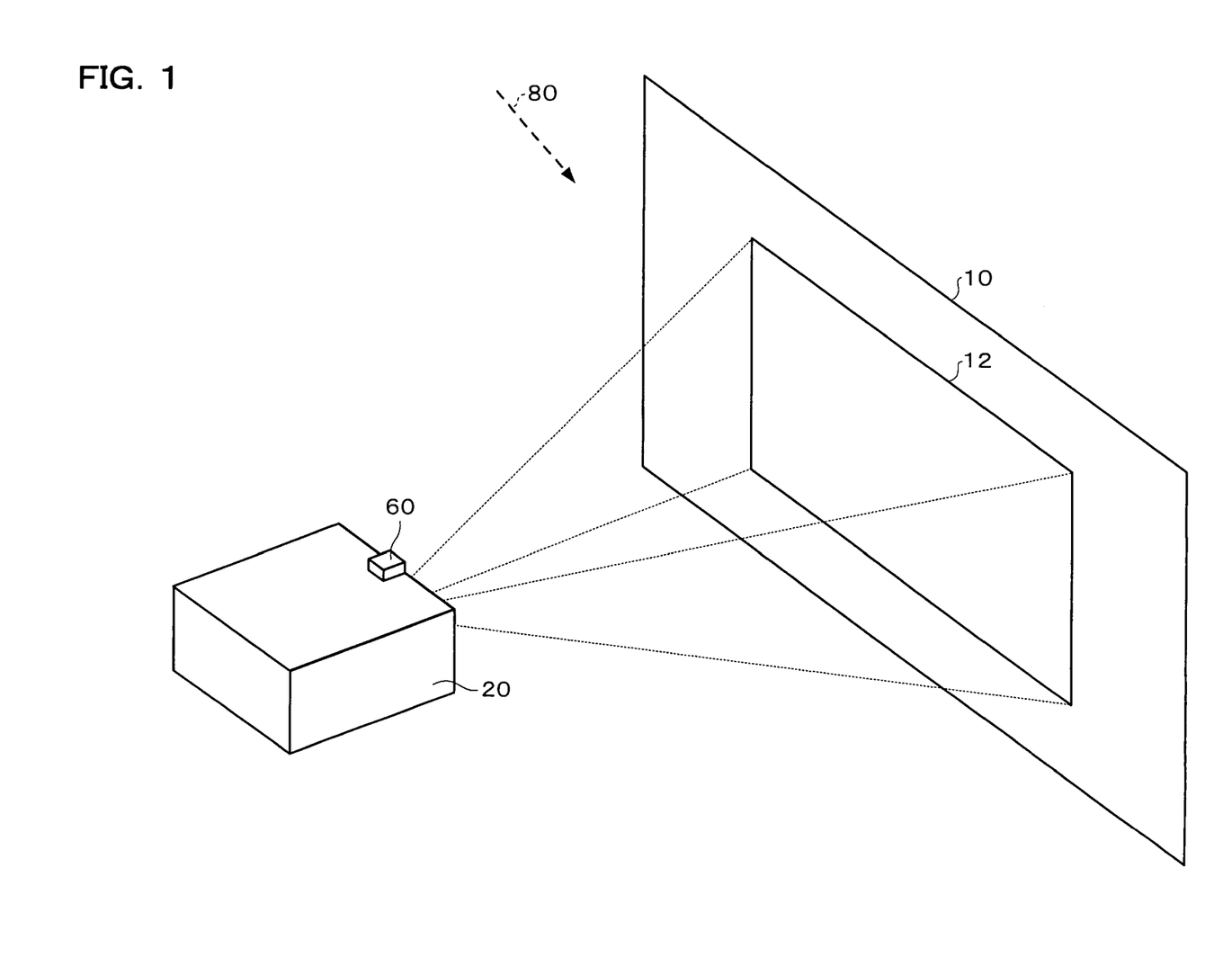
FIG. 1 is a schematic view of the entire image processing system in accordance with an example of an embodiment of the present invention.

A schematic view of an entire image processing system in accordance with an example of this embodiment is shown in FIG. 1.

A projector 20 projects an image towards a screen area 10. This causes the formation of a projection area 12 that is an image display area in the screen area 10.

If an image display device such as the projector 20 is used for displaying an image a long period of time in this manner, time-related deterioration in components such as the optical system will gradually cause color non-uniformity (including color non-uniformity due to luminance non-uniformity) in the image.

On top of that, the effects of ambient light 80 such as daylight or artificial lighting will change the way in which the image in the projection area 12 is seen.

To correct such color non-uniformity in the image, the projector 20 of this projector 20 is provided with a color light sensor 60 that is a sensing means. The color light sensor 60 senses that includes the projection area 12.

The projector 20 divides the projection area 12 into a plurality of target areas, based on that sensing information; calculates an average brightness index value for each target area; calculates a correction amount for each target area, based on those average brightness index values; and corrects color and other variations of the image, based on those correction amounts.

The description now turns to the concept of color non-uniformity correction in this embodiment.

Figure 2:
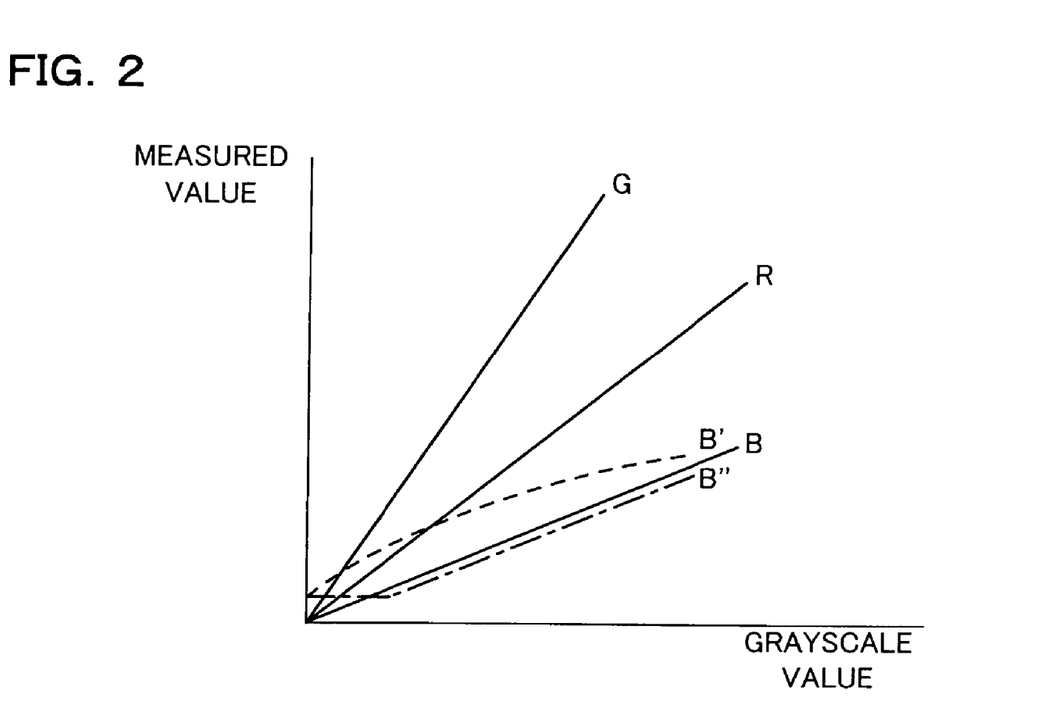
FIG. 2 is a conceptual view illustrating the concept of color non-uniformity correction in accordance with an example of this embodiment.

A conceptual view illustrating the concept of color non-uniformity correction in accordance with an example of this embodiment is shown in FIG. 2. Note that the input-output characteristic of the projector 20 in this case is assumed to be controlled such that: gamma value=1.

Assume that the projector projects single-color red (R), green (G), and blue (B) calibration images while varying the grayscale values thereof, and the color light sensor 60 measures those calibration images. In the initial state, there is no deterioration with time, so the relationship between the grayscale values of the calibration images and the values measured by the color light sensor 60 is substantially a straight line.

However, regardless of whether the above-described relationship for B was originally a straight line on the graph, deterioration with time will turn that relationship into a curve such as that shown at B'. As a result, this will change the way in which the image projected by the projector 20 is seen.

This embodiment of the invention makes it possible to guarantee the RGB color balance by correcting an error such as color non-uniformity to lie along a straight line that is close to the straight line B in the original state with as little color non-uniformity as possible, as shown at B", enabling appropriate correction of color non-uniformity due to deterioration with time.

The description now turns to the functional blocks of the projector 20 that implement the above function.

Figure 3:
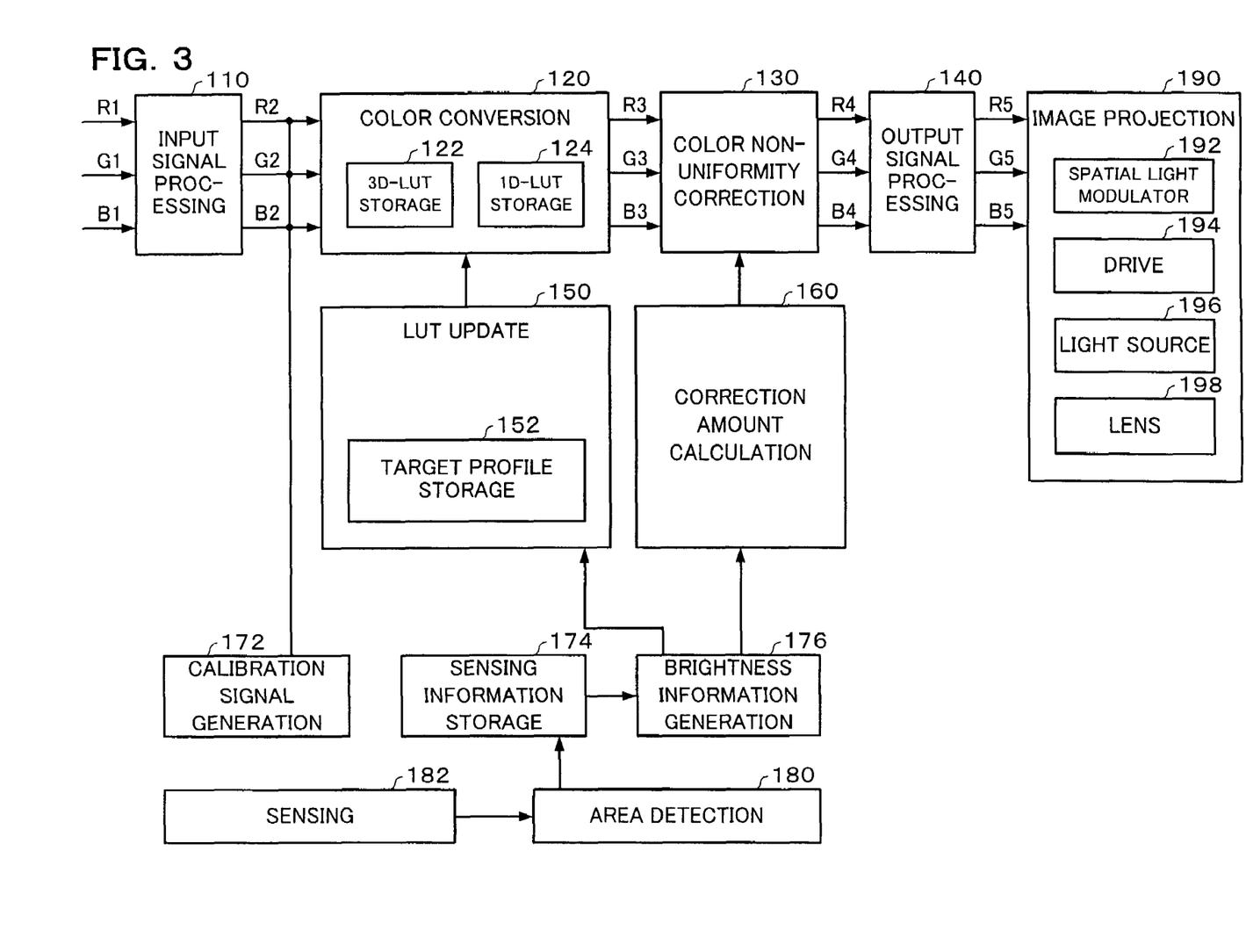
FIG. 3 is a functional block diagram of a projector in accordance with an example of this embodiment.

A functional block diagram of the projector 20 in accordance with an example of this embodiment is shown in FIG. 3.

The projector 20 comprises an image projection section 190 that is a display means for projecting a predetermined calibration image; a sensing section 182 having the color light sensor 60, for sensing the projected calibration image; an area detection section 180 for detecting the image display area, based on sensing information obtained by the sensing section 182, and dividing that image display area into a plurality of areas; a brightness information generation section 176 for generating brightness information that expresses an average brightness index value for each target area that has been divided by the area detection section 180, based on the sensing information; a correction amount calculation section 160 for calculating a correction amount for the input-output characteristic data of each target area, based on that brightness information; and a color non-uniformity correction section 130 for correcting any color non-uniformity of the image, based on the input-output characteristic data that has been corrected based on those correction amounts.

Note that the input-output characteristic data in this case is data that expresses the relationship between brightness index values (such as grayscale values) of an input signal and brightness index values (such as luminance values, illumination intensities, and color information values) of an output signal. The brightness index value is a value that provides an index of brightness. More specifically, it is equivalent to values such as luminance value, illuminance, color information value (such as a digital signal equivalent to the R signal), grayscale value, or a normalized version of those values, by way of example. In this embodying example, the luminance value (more specifically, a normalized Y value) is used as the brightness index value.

The projector 20 also comprises an input signal processing section 110; a color conversion section 120 having a three-dimensional look-up table (3D-LUT) storage section 122 and a one-dimensional look-up table (1D-LUT) storage section 124, for converting the colors of images; an output signal processing section 140, and an LUT update section 150 having a target profile storage section 152, for updating the D-LUT and 1D-LUT.

In addition, the projector 20 comprises a calibration signal generation section 172 that generates an image signal for displaying a calibration image and a sensing information storage section 174 that temporarily stores sensing information from the area detection section 180.

The image projection section 190 comprises a spatial light modulator 192, a drive section 194 for driving the spatial light modulator 192, a light source 196, and a lens 198.

The drive section 194 drives the spatial light modulator 192 based on image signals from an output signal processing section 140. The image projection section 190 projects light from the light source 196 through the spatial light modulator 192 and the lens 198.

The hardware for implementing the above-described components of the projector 20 could be as described below.

Figure 4:
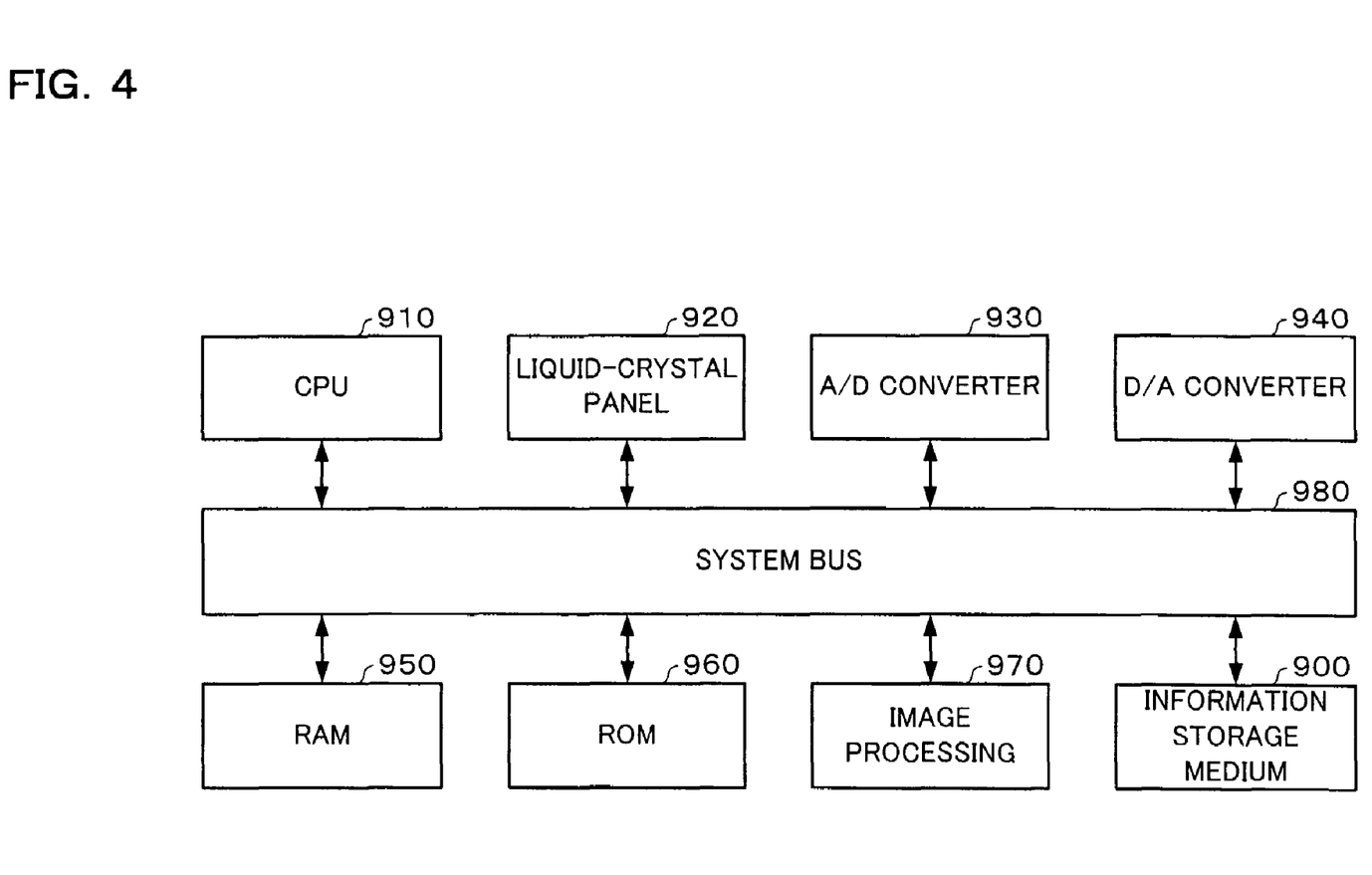
FIG. 4 is a hardware block diagram of the projector in accordance with an example of this embodiment.

A hardware block diagram of the projector 20 in accordance with an example of this embodiment is shown in FIG. 4.

For example, the configuration could be implemented by an A/D converter 930 or the like as the input signal processing section 110; RAM 950 or the like as the sensing information storage section 174; an image processing circuit 970 or the like as the color non-uniformity correction section 130, the calibration signal generation section 172, and the brightness information generation section 176; a CPU 910 or the like as the correction amount calculation section 160; the image processing circuit 970, the RAM 950, and the CPU 910 as the color conversion section 120, the LUT update section 150, and the area detection section 180; a D/A converter 940 or the like as the output signal processing section 140; a liquid-crystal panel 920 or the like as the spatial light modulator 192; and a ROM 960 in which is stored a liquid-crystal light valve driver for driving the liquid-crystal panel 920, as the drive section 194.

Note that these components can exchange information between themselves over a system bus 980.

These components could be implemented in a hardware fashion by circuitry, or in a software manner by drivers or the like.

In addition, an information storage medium 900 in which is stored a program that causes a computer to function as components such as the correction amount calculation section 16 could be installed in the computer, which reads out the program in order to function as the correction amount calculation section 160, etc.

This information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to install the above-described functions.

The description now turns to the flow of image processing using these components.

Figure 5:
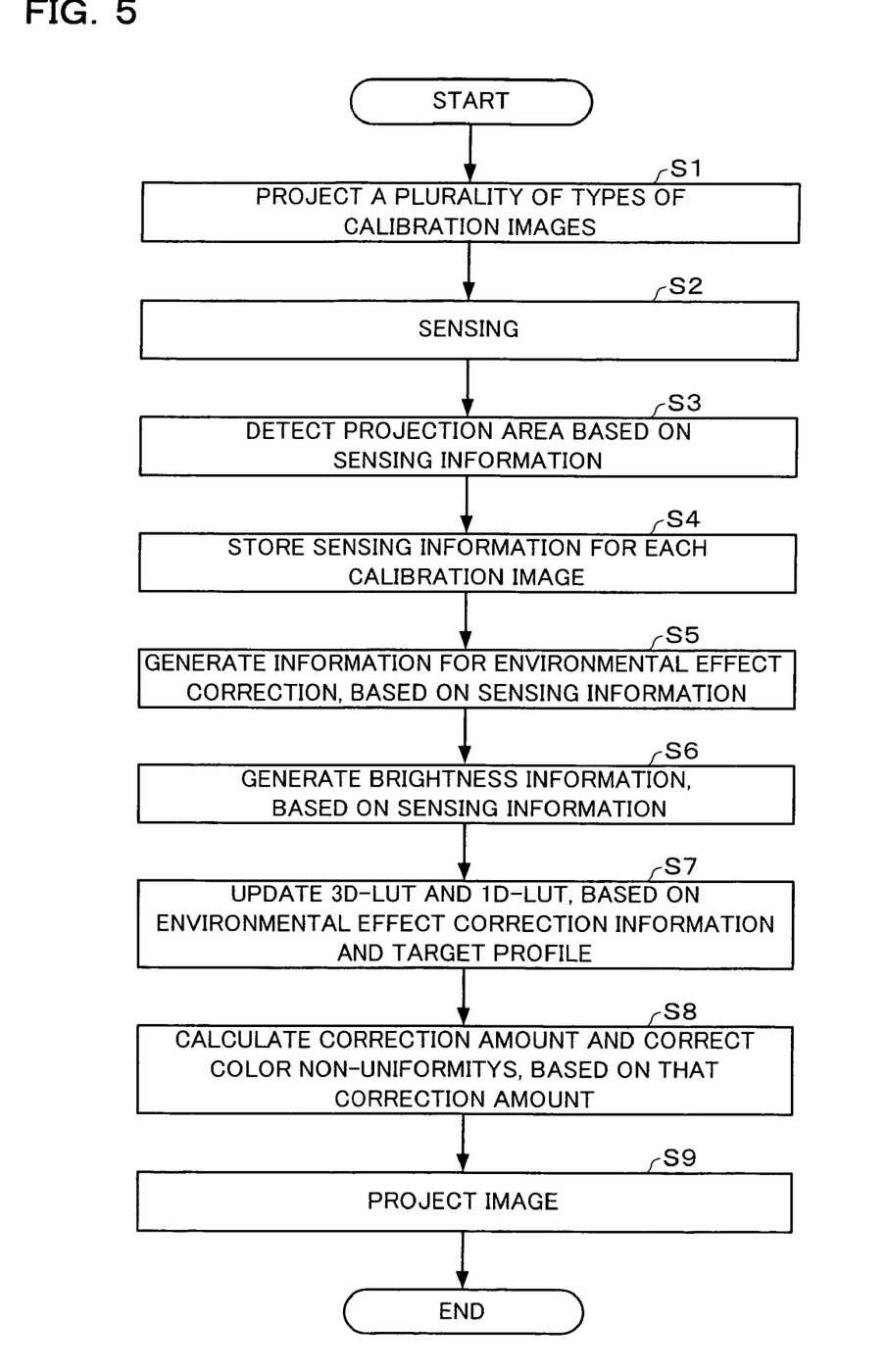
FIG. 5 is a flowchart of the flow of color non-uniformity correction processing in accordance with an example of this embodiment.

A flowchart of the flow of color non-uniformity correction processing in accordance with this embodiment is shown in FIG. 5.

First of all, the projector 20 projects a plurality of types of single-color calibration images (step S1). More specifically, the projector 20 projects white (W) and black (K) calibration images and R, G, and B calibration images in which the grayscales are varied in predetermined grayscale units.

The description now turns to specific details of image processing when an image is to be projected in this case.

The input signal processing section 110 converts an R1 signal, a G1 signal, and a B1 signal (which are RGB signals in analog form that are input from a personal computer (PC) or the like) into an R2 signal, a G2 signal, and a B2 signal in digital form.

The calibration signal generation section 172 generates an R2 signal, a G2 signal, and a B2 signal in digital form that are used for displaying a calibration image.

Generating the calibration signals within the projector 20 in this manner makes it possible for the projector 20 itself to perform the calibration, without having to input calibration signals from an external input device such as a PC. Note that the configuration could also be such that the calibration signal generation section 172 is not provided and the calibration image signals are input from a PC or the like.

The color conversion section 120 outputs an R3 signal, a G3 signal, and a B3 signal that are the R2 signal, the G2 signal, and the B2 signal from the input signal processing section 110 or the calibration signal generation section 172, after correcting for factors such as the default (initial) color temperature of the projector 20, based on the 3D-LUT of the 3D-LUT storage section 122 and the 1D-LUT of the 1D-LUT storage section 124.

More specifically, note that the 1D-LUT storage section 124 contains a gamma table and a color balance table (or even just one of them, in some cases), for correcting the brightness of the image. Similarly, the 3D-LUT storage section 122 contains a color space correction table and a color temperature correction table (or even just one of them, in some cases), for correcting the colors of the image.

The color conversion section 120 outputs the R3 signal, G3 signal, and B3 signal that have had factors such as the color temperature corrected, based on these tables.

The color non-uniformity correction section 130 corrects the R3 signal, G3 signal, and B3 signal, based on the R3 signal, G3 signal, and B3 signal from the color conversion section 120 and default luminance correction amount data, and outputs them as an R4 signal, G4 signal, and B4 signal.

The output signal processing section 140 converts the R4 signal, G4 signal, and B4 signal that are in digital form into a R5 signal, G5 signal, and B5 signal in analog form, and outputs those analog image signal (the R5 signal, G5 signal, and B5 signal) to the image projection section 190.

Note that if the projector 20 uses only RGB signals in digital form, the A/D conversion processing and D/A conversion processing are not necessary.

The projector 20 projects a plurality of types of calibration images by the above-described procedure.

The sensing section 182 of the projector 20 senses that comprises the projection area 12, in a state in which a calibration image is projected onto the screen area 10, and outputs sensing information (step S2). Note that the sensing information is expressed as XYZ values, by way of example. In this case, the XYZ values are tristimulus values in an XYZ color system that is a device-independent color system determined by the Commission Internationale de l'Eclairage (CIE). In the XYZ color system, the Y value can be handled as a luminance value.

The area detection section 180 detects the projection area 12 from the sensed area, based on sensing information for a W calibration image and sensing information for a K calibration image, (step S3). The area detection section 180 also divides the thus-detected projection area 12 into a plurality of areas.

Figure 6:
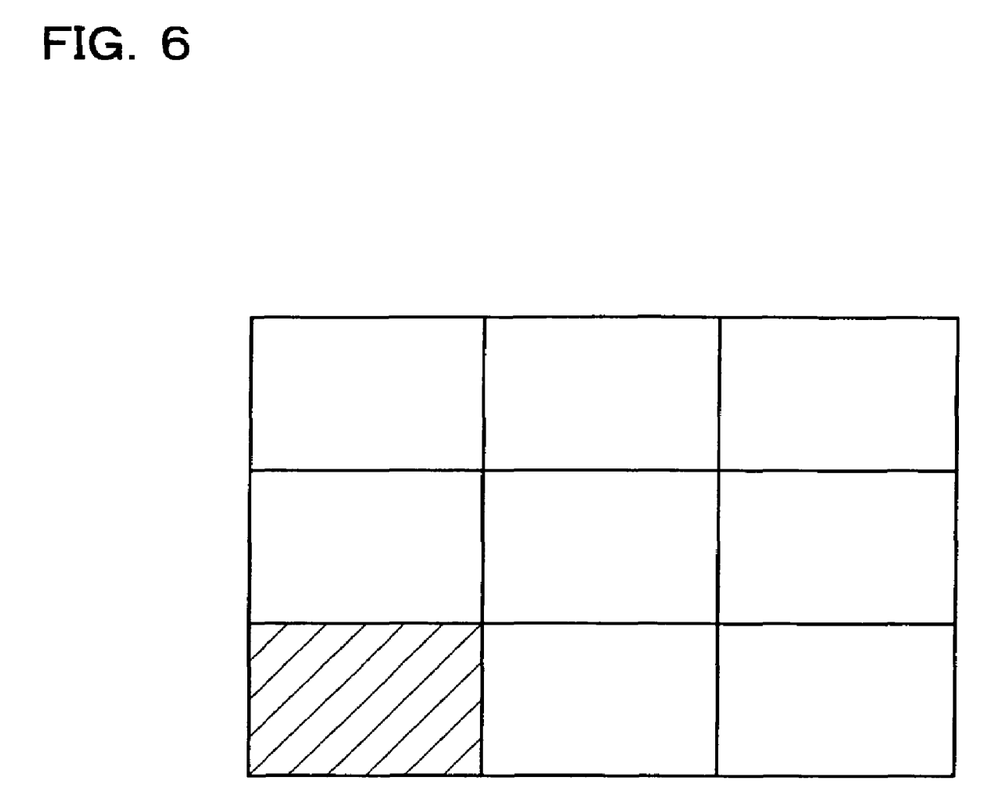
FIG. 6 is a conceptual view of the division of the image display area and the calculation of the average brightness index value in accordance with an example of this embodiment.

A conceptual view of a division of the image display area and the calculation of the average brightness index value thereof in accordance with an example of this embodiment is shown in FIG. 6.

The area detection section 180 divides the captured image of the projection area 12 into the nine areas shown in FIG. 6, by way of example. Take the rectangle that is shaded in FIG. 6 as one target area. It should be obvious that the number of divisions is not limited to nine, and thus any number of divisions other than nine can be used therefor, such as four, 16, or 25. It is also not necessary to divide up the area uniformly.

The sensing information storage section 174 stores sensing information for the W and K calibration images and sensing information for the calibration images in each grayscale value for R, G, and B (step S4).

The brightness information generation section 176 generates information that expresses the average XYZ tristimulus values in the target area when the W and K calibration images are projected and the average XYZ tristimulus values in the target area when the R, G, and B calibration images of predetermined grayscale values are projected, based on the sensing information stored in the sensing information storage section 174 and area information from the area detection section 180, as information for correcting for environmental effects (step S5).

The brightness information generation section 176 also generates brightness information based on the sensing information stored in the sensing information storage section 174 and area information from the area detection section 180 (step S6). Note that this brightness information is information that comprises area information indicating which of the target areas shown in FIG. 6 is being used, grayscale value information indicating the grayscale value of the calibration image, image information indicating which of the plurality of different calibration images is being used; and average brightness information indicating the average brightness index value in that target area.

The LUT update section 150 then updates the 3D-LUT and the 1D-LUT, based on the information for correcting for environmental effects, which was generated by the brightness information generation section 176, and a target profile stored in the target profile storage section 152 (step S7). Note that the target profile is information indicating details such as the image colors that used as a target, such as the R, G, B, and W colors, the W color temperature, and the gamma value.

More specifically, the LUT update section 150 bases the update of the 3D-LUT stored in the 3D-LUT storage section 122 on the average values of the XYZ tristimulus values for W, K, R, G, and B and color information that expresses a target profile. Similarly, the LUT update section 150 bases the update of the 1D-LUT stored in the 1D-LUT storage section 124 on the average Y values for W and K and the gamma value of the target profile.

The color conversion section 120 corrects the colors of the image in such a manner as to reproduce a target color (such as a color conforming to sRGB), based on the updated 3D-LUT, and corrects the brightness of the image, based on the updated 1D-LUT, and outputs the R3 signal, G3 signal, and B3 signal.

The correction amount calculation section 160 calculates a correction for the input-output characteristic data for each target area, based on the brightness information generated by the brightness information generation section 176, and outputs it as information for correcting color non-uniformity.

The description now turns to an input-output characteristic curve that represents input-output characteristic data in a graphical format, to show the relationship between input grayscale value and normalized Y value.

Figure 7:
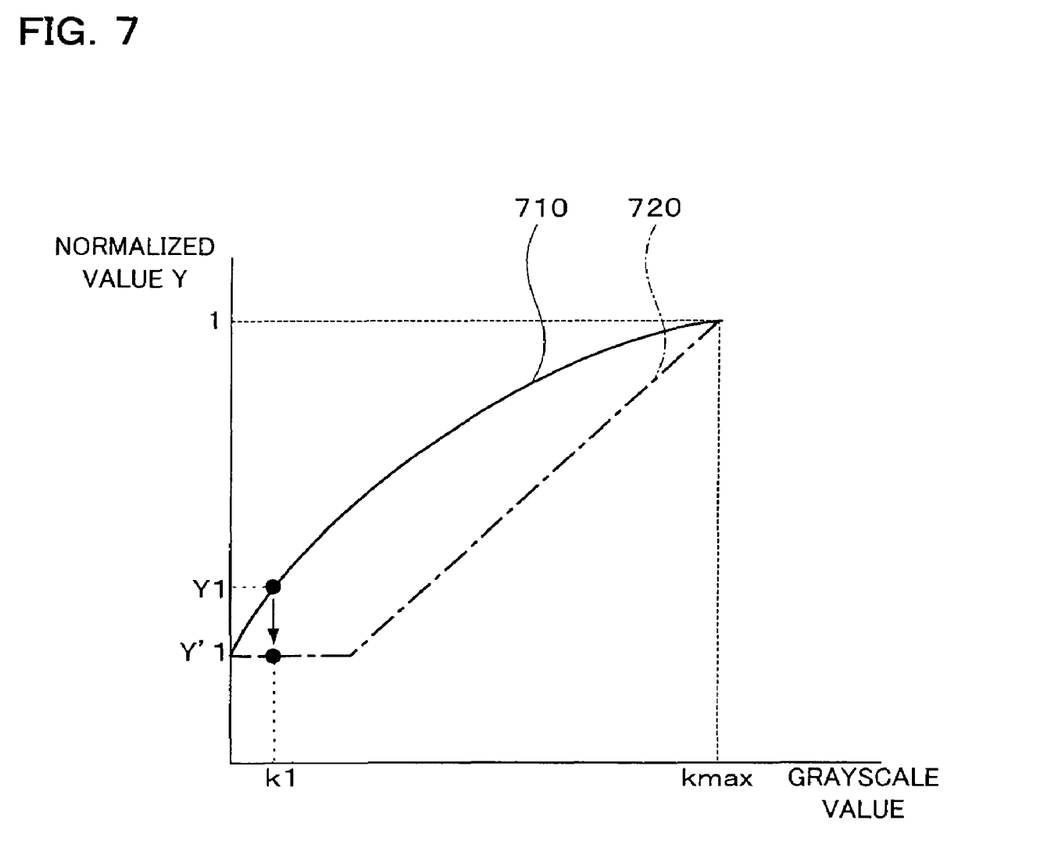
FIG. 7 is a conceptual view of an input-output characteristic curve in accordance with an example of this embodiment.

A conceptual view of an input-output characteristic curve in accordance with an example of this embodiment is shown in FIG. 7.

As shown by way of example in FIG. 7, if a pre-correction input-output characteristic curve 710 has a normalized Y value of 1 at a maximum grayscale kmax, the correction amount calculation section 160 calculates a correction amount that is a straight line passing through the maximum grayscale value of kmax and a point where the normalized Y value is 1, as shown in FIG. 7. If the grayscale value before correction is k1, by way of example, when the grayscale value is k1 on a straight line 720 representing the input-output characteristic after the correction, the normalized Y value is Y'1 and the difference from this normalized Y value (a=Y1−Y1') becomes the correction amount.

Note that a normalized Y value that ensures that the slope of the straight line 720 representing the input-output characteristic after the correction is 1 is used as the brightness index value in FIG. 7. In addition, it is not always necessary to use calibration images for the entire range of grayscale values; corrections for grayscale values that are not used can be interpolated by a generic method such as linear interpolation. When the grayscale value is 0 in FIG. 7, the normalized Y value is not 0 but is a positive value, but this is because there is some leakage of light in the optical system.

The thus-configured correction amount calculation section 160 calculates a correction amount a for the predetermined grayscale value. The color non-uniformity correction section 130 corrects the input-output data by correction amounts corresponding to the grayscale values of the image that is actually displayed, then corrects color non-uniformity by correcting the R3 signal, G3 signal, and B3 signal, based on the corrected input-output characteristic data (step S8).

The output signal processing section 140 converts the post-correction R4 signal, G4 signal, and B4 signal in digital form into the R5 signal, G5 signal, and B5 signal in analog form, and outputs them to the image projection section 190. The image projection section 190 projects the image, based on the R5 signal, G5 signal, and B5 signal (step S9).

Thus this embodiment enables the projector 20 to detect deterioration in a part of the image, by dividing the image display area into a plurality of target areas and detecting an average brightness index value in each target area.

The projector 20 is also able to project an image in which portions other than low-grayscale portions are in a state similar to that with no deterioration with time, by calculating a correction amount such as to correct the input-output characteristic toward the input-output characteristic with no color non-uniformity, based on an average brightness index value for each grayscale value that is based on brightness information, and correcting color non-uniformity based on that correction amount, as shown in FIG. 2. This enables the projector 20 to ensure a color balance between the R, G, and B colors.

Thus the projector 20 can correct color non-uniformity due to deterioration with time in an appropriate manner.

Since the projector 20 can project a calibration image for each of a plurality of grayscale values in R, G, and B and obtain an average brightness index value for each grayscale value, it can clarify any difference in average brightness index value for each area, and also clarify any difference in average brightness index value for each grayscale value. This enables the projector 20 to correct color non-uniformity due to deterioration with time in a more appropriate manner.

In addition, this embodiment enables the projector 20 to project a more appropriate image, regardless of the environment in which the projector 20 is used, by not only correcting color non-uniformity due to deterioration with time, but also by correcting the image signal from consideration of the ambient light 80 and the material of the screen.

Since the projector 20 can correct errors such as color non-uniformity due to deterioration with time in this manner, it can also suppress deterioration of image quality even when it is projecting an image for a long time continuously, particularly in an exhibition hall, by way of example. This enables a reduction in the frequency with which the user has to maintain the projector 20 with respect to deterioration with time and replace the optical components of the projector 20, making it possible to use the projector 20 continuously for long periods of time.

Modifications

The present invention was described above with reference to preferred embodiments thereof but it should be obvious to those skilled in the art that the application of the present invention is not limited to the above-described embodying examples.

For example, in the above embodying examples, a normalized Y value was used as the brightness index value, but it is equally possible to use another value such as a luminance value, illuminance, color information value (such as a digital signal equivalent to the R signal), grayscale value, or a normalized version of those values.

This makes it possible for the projector 20 to correct the brightness of the image, enabling correction of color non-uniformity.

In the above described example, the input-output characteristic in a state where there is no color non-uniformity was described as being a straight line, but that is based on the premise that a gamma value of 1 is used during gamma correction, so it is possible that the input-output characteristic with no color non-uniformity is not a straight line. The present invention can also be applied to such a case.

The embodying examples described above related to examples in which an image processing system is mounted in the projector 20, but the image processing system could equally well be mounted in an image display device other than the projector 20, such as a cathode ray tube (CRT). A projector such as a digital micromirror device (DMD) could also be used as the projector 20, other than a liquid-crystal projector. Note that DMD is a trademark registered to Texas Instruments Inc. of the USA.

The functions of the above-described projector 12 could be implemented by the projector alone, by way of example, or they could be implemented by distributing them between a plurality of processing devices (such as between the projector and a PC).

What is claimed is:

1. An image processing system comprising:
    a display means for displaying a predetermined calibration image;
    a sensing means for sensing the displayed calibration image;
    an area detection means for detecting an image display area based on sensing information obtained by the sensing means, and also dividing the image display area into a plurality of target areas;
    a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

2. The image processing system as defined in claim 1, wherein the display means displays a plurality of types of calibration images having different grayscale values, and wherein the brightness information generation means generates information as the brightness information, the information including:

area information indicating which of the target areas is applicable;

grayscale value information indicating a grayscale value of the calibration image;

image information indicating which of the plurality of types of calibration images is used; and an average brightness index value information indicating average brightness index value in the target area.

3. The image processing system as defined in claim 2, wherein the correction amount calculation means calculates a correction amount so that an input-output characteristic approaches a state in which there is no color non-uniformity, based on the average brightness index value for each grayscale value that is based on the brightness information.

4. An image processing system comprising:

a display section which displays a predetermined calibration image;

a sensing section which senses the displayed calibration image;

an area detection section which detects an image display area based on sensing information obtained by the sensing section, and also divides the image display area into a plurality of target areas;

a brightness information generation section which generates brightness information which indicates an average brightness index value within each of the target areas that have been divided by the area detection section, based on the sensing information;

a correction amount calculation section which calculates a correction amount for input-output characteristic data from each of the target areas, based on the brightness information; and a color non-uniformity correction section which corrects color non-uniformity of the image in each of the target areas, based on input-output characteristic data that has been corrected based on the correction amount, wherein the display section displays an image in which color non-uniformity has been corrected by the color non-uniformity correction section.

5. A projector comprising:

a display means for projecting a predetermined calibration image;

a sensing means for sensing the projected calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

6. A projector comprising:

a display section which projects a predetermined calibration image;

a sensing section which senses the projected calibration image;

an area detection section which detects an image display area based on sensing information obtained by the sensing section, and also divides the image display area into a plurality of target areas;

a brightness information generation section which generates brightness information which indicates an average brightness index value within each of the target areas that have been divided by the area detection section, based on the sensing information;

a correction amount calculation section which calculates a correction amount for input-output characteristic data from each of the target areas, based on the brightness information; and a color non-uniformity correction section which corrects color non-uniformity of the image in each of the target areas, based on input-output characteristic data that has been corrected based on the correction amount, wherein the display section displays an image in which color non-uniformity has been corrected by the color non-uniformity correction section.

7. A computer-readable program causing the computer to function as:

a display control means for controlling a display means for displaying a predetermined calibration image;

a sensing control means for controlling a sensing means for sensing the displayed calibration image;

an area detection means for detecting an image display area based on sensing information obtained by the sensing means, and also dividing the image display area into a plurality of target areas;

a brightness information generation means for generating brightness information which indicates an average brightness index value within each of the target areas that have been divided by the area detection means, based on the sensing information;

a correction amount calculation means for calculating a correction amount for input-output characteristic data from each of the target areas, based on the brightness information; and a color non-uniformity correction means for correcting color non-uniformity of the image in each of the target areas, based on input-output characteristic data that has been corrected based on the correction amount, wherein the display means displays an image in which color non-uniformity has been corrected by the color non-uniformity correction means.

8. An information storage medium which stores a computer-readable program, the program causing the computer to function as:
- a display control means for controlling a display means for displaying a predetermined calibration image;
- a sensing control means for controlling a sensing means for sensing the displayed calibration image;
- an area detection means for detecting an image display area based on sensing information obtained by the sensing means, and also dividing the image display area into a plurality of target areas;
- a brightness information generation means for generating brightness information which indicates an average brightness index value within each of the target areas that have been divided by the area detection means, based on the sensing information;
- a correction amount calculation means for calculating a correction amount for input-output characteristic data from each of the target areas, based on the brightness information; and
- a color non-uniformity correction means for correcting color non-uniformity of the image in each of the target areas, based on input-output characteristic data that has been corrected based on the correction amount,
- wherein the display means displays an image in which color non-uniformity has been corrected by the color non-uniformity correction means.

9. An image processing method comprising:
- displaying a predetermined calibration image;
- sensing the displayed calibration image; and generating sensing information;
- detecting an image display area based on the sensing information;
- dividing the image display area into a plurality of target areas;
- generating brightness information which indicates an average brightness index value within each of the target areas that have been divided, based on the sensing information;
- calculating a correction amount for input-output characteristic data from each of the target areas, based on the brightness information; and
- correcting color non-uniformity of the image in each of the target areas, based on input-output characteristic data that has been corrected based on the correction amount;
- displaying an image in which color non-uniformity has been corrected.

10. The image processing method as defined in claim 9, further comprising:
- displaying a plurality of types of calibration images having different grayscale values, when the predetermined calibration image is displayed; and
- generating information as the brightness information, the information including:
- area information indicating which of the target areas is applicable;
- grayscale value information indicating a grayscale value of the calibration image;
- image information indicating which of the plurality of types of calibration images is used; and
- an average brightness index value information indicating average brightness index value in the target area.

11. The image processing method as defined in claim 10, further comprising:
- calculating a correction amount so that an input-output characteristic approaches a state in which there is no color non-uniformity, based on the average brightness index value for each grayscale value that is based on the brightness information.

* * * * *